United States Patent [19]

Bougard

[11] Patent Number: 4,734,960
[45] Date of Patent: Apr. 5, 1988

[54] EQUIPMENT FOR DIRECT FUEL FIRING

[76] Inventor: Jacques L. Bougard, Le Beaulieu 44, 6140 Fontaine-l'Evêque, Belgium

[21] Appl. No.: 727,662

[22] Filed: Apr. 26, 1985

[30] Foreign Application Priority Data

May 3, 1984 [BE] Belgium .................................. 212862

[51] Int. Cl.⁴ .............................................. B02C 23/24
[52] U.S. Cl. ..................................... 241/47; 241/154; 241/160; 241/162; 241/171; 241/188 A
[58] Field of Search ............... 241/54, 57, 152 R, 154, 241/155, 160, 162, 171, 188 A, 47; 110/347

[56] References Cited

U.S. PATENT DOCUMENTS

| | | | |
|---|---|---|---|
| 2,468,389 | 4/1949 | Auer | 241/162 X |
| 2,882,149 | 4/1959 | Willems | 241/162 X |
| 4,054,292 | 10/1977 | Stone | 241/DIG. 14 X |

Primary Examiner—Timothy V. Eley
Attorney, Agent, or Firm—Laff, Whitesel, Conte & Saret

[57] ABSTRACT

There is described a method for direct fuel firing, particularly for plants such as hot water generators, etc., operating with a burner, a combustion chamber and a high-temperature exchanger, which comprises using a moist solid fuel, crushing said fuel upstream of said combustion chamber, and feeding directly therein, without lowering the water content thereof, the crushed fuel in the presence of a primary combustive fluid, and an equipment for the working of said method.

17 Claims, 3 Drawing Sheets

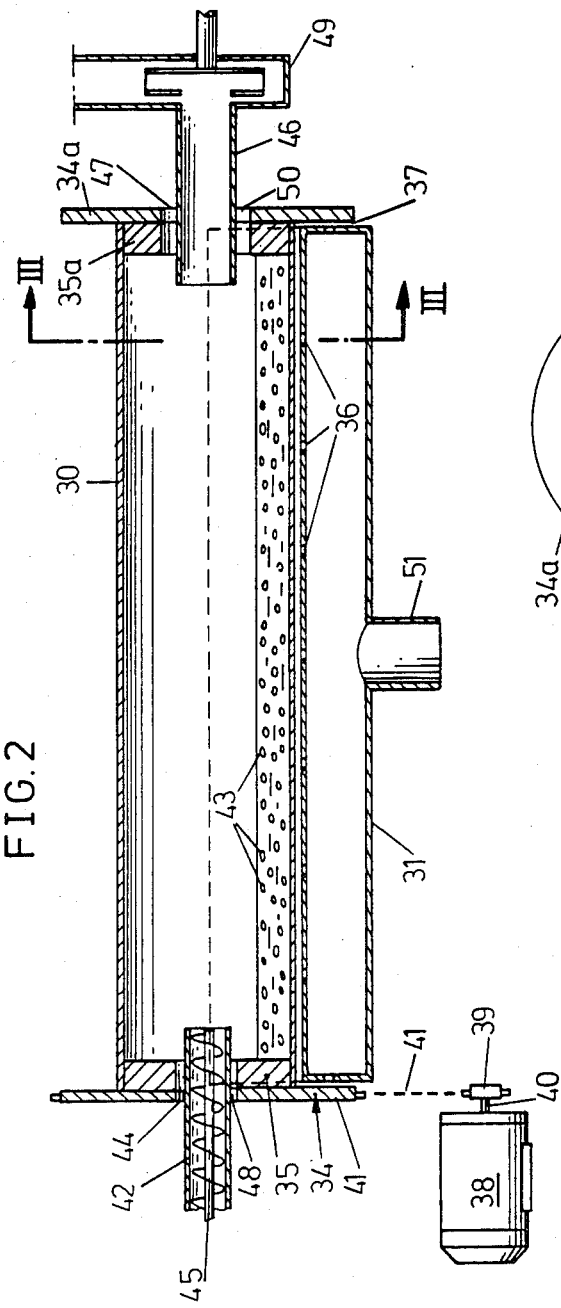
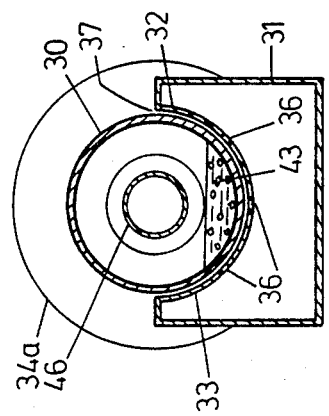

EQUIPMENT FOR DIRECT FUEL FIRING

This invention relates to a method and an equipment for direct fuel firing, particularly for plants such as hot water, steam and hot gas generators, cooking ovens, dryers, which operate with a burner, a combustion chamber and a high-temperature exchanger.

BACKGROUND

The main drawback encountered when using the conventional firing methods with pulverized coal, of either a direct or indirect type, is found in the requirement to dry the fuel in order to make the moisture therein be around 1%, and thus insure the product fluidity. Moreover it does also appear as necessary with such known methods, to perform the intermediate conveying and storage steps for the dried pulverized coal under nitrogen atmosphere to limit the explosion dangers. Finally the combustion products or vapours in the conventional methods and equipments, are directly discharged to the atmosphere, without any filtering, which is highly nefarious to the environment.

BRIEF DESCRIPTION OF INVENTION

An object of the invention is to eliminate such drawbacks and to provide a method for direct fuel firing, particularly for plants such as hot water, steam and hot gas generators, cooking ovens, dryers, which operate with a burner, a combustion chamber and a high-temperature exchanger, as well with firing equipment for the working of said method. The invention differs from the conventional methods and plants, by the elimination of the drying operation which is used to insure the product fluidity, as well as the elimination of the intermediate conveying and storing of the dried pulverized coal, while still the system to scrub the combustion products or vapours discharged into the atmosphere. The equipment according to the invention has moreover been proven as highly reliable, very safe, quite simple and of low manufacturing, operating and maintenance cost.

For this purpose according to the invention, the direct firing method comprises using a moist solid fuel, such as coal with a high volatile content, for example 0-6 mm fines from coking, rich or flaming coal, the water content of which lies in the range from 4 to 50%, or else a biomass with high heat power, which actually comprise the conventional energy which is the most plentiful, the best distributed and the most inexpensive in the world, crushing said fuel upstream of the combustion chamber, and feeding directly thereto, without lowering the fuel water content, the crushed fuel in the presence of a primary combustive fluid.

In one embodiment of the invention, the fuel is crushed in the presence of a primary combustive gaseous material the flow rate of which is lower than the ignition-limit flow rate.

In another embodiment of the invention, a fuel which is crushed has a water content which lies between 30 and 50% of the mixture, to obtain a fluid paste which may be pumped into the combustion chamber.

In an advantageous embodiment of the invention, at the outlet from the high-temperature exchanger, there is recovered by condensing, the heat from the combustion gases, and the combustion products or vapours to be discharged to the atmosphere are scrubbed, said recovering and scrubbing operations may be applied to any fuel type, particularly solid fuels.

According to the invention, there is also provided a direct firing equipment for the working of said method, which comprises upstream of the equipment combustion chamber, means for crushing the moist solid fuel, in the presence of the primary combustive fluid, and for injecting directly said crushed fuel into said combustion chamber.

In an embodiment of the invention, the means for crushing the fuel are comprised of an impact crusher which comprises on a line along a vertical axis. An upper enclosure is provided with a fuel-supply duct to which a feed regulator such as an endless screw regulator, is associated. A primary combustive gas feed duct has a flow regulator associated therewith, which is arranged to have a flow which is large enough to retain the pulverized fuel in turbulent suspension and is not large enough to cause an igniting thereof. At least one crushing enclosure a truncated cone-shaped funnel, the axis of which lies on the vertical axis and the large base of which is connected to the upper enclosure. The small base of the funnel lies facing a crushing disk which is fastened to the shaft of a motor supported inside the crushing enclosure. The motor and disk are co-axial with the funnel. The fuel which is being crushed by the disk is projected against the inner wall of a casing that is provided by the crushing enclosure and surrounding the funnel. A lower enclosure is connected to the crushing enclosure casing, which is provided with a duct for discharging crushed fuel and primary combustive medium into the combustion chamber.

In another embodiment of the invention, the means for crushing the fuel are comprised of a ball crusher which has a cylindrical-shaped drum, the length of which is larger than the diameter thereof. The drum is supported to have its axis substantially horizontal. A driving means is arranged as to rotate the drum about its axis. A fuel-supply duct is fixed relative to the drum and co-axial therewith. The duct passes through an opening inside the drum and through an opening provided in the one base thereof, a feed regulator (such as an endless screw regulator) is arranged inside the supply duct. A duct for discharging the pulverized fuel is fixed relative to the drum and co-axial therewith. The discharge duct passes through an opening inside the drum and through an opening provided in the other base thereof. Means are provided for circulating the pulverized fuel and the primary combustive medium from the drum to the combustion chamber.

In a particularly advantageous embodiment of the invention, the firing equipment comprises upstream of the plant exchanger, a condensing heat extractor for making separating the fly ashes and noxious materials easier, which is so arranged as to have the combustions products or vapours and a recovery fluid, such as water, flow in counter-current along a vertical or slanting direction relative to the vertical, said extractor comprising means for washing those surfaces which contact the combustion products.

Besides said advantages, the equipment according to the invention further allows to scrub the combustion products or vapours discharged to the atmosphere, by feeding either in the fuel crushing location, or in the combustion gas heat recovery location, substances which can fix the noxious materials, such as sulphur and fly ashes, such as for example neutralizing products, such as calcium carbonate, potassium carbonate, sodium carbonate or quicklime.

BRIEF DESCRIPTION OF THE DRAWINGS

Other details and features of the invention will stand out from the following description, given by way of non limitative example and with reference to the accompanying drawings, in which:

FIG. 2 is a diagrammatic elevation and section view of a ball crusher embodiment for the direct firing equipment according to the invention.

FIG. 3 is a section view along line III—III in FIG. 2.

In the various figures, the same reference numerals pertain to identical or similar elements.

DETAILED DESCRIPTION OF THE INVENTION

As already stated hereinabove, the inventive direct firing method is particularly suitable for plant kinds such hot water, steam and hot gas generators, cooking ovens, and drum dryers. These plants operate with a burner, a combustion chamber and a high-temperature exchanger. They use a moist solid fuel, such as coal with high volatile material content, for exemple 0–6 mm fines from coking, rich or flaming coals, or a biomass with high heat power, for example 0–10 mm wood particles. The water content of the fuel is in the range from 4 to 50%. The fuel is very finely upstream of the combustion chamber, and then is fed directly into the chamber, without lowering the water content thereof. The crushed fuel is burned in the presence of a primary combustive fluid.

Figure 1:
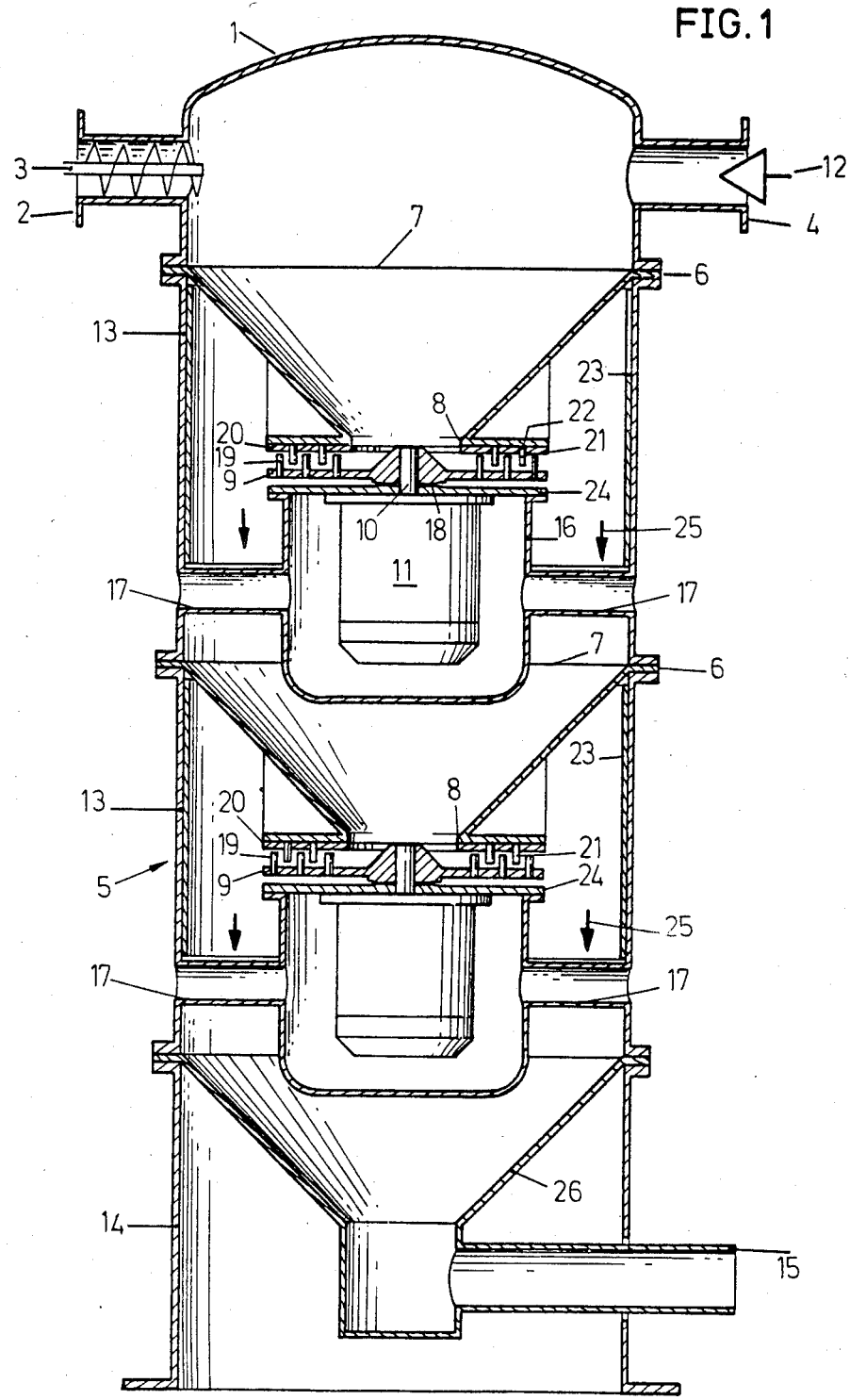
FIG. 1 is a diagrammatic elevation and section view, showing an impact crusher embodiment for the direct firing equipment according to the invention.

FIG. 1 as stated above, shows an embodiment for part of the direct firing equipment of the invention, that is an impact crusher being used for fuels, particularly 0–6 mm fines from coking, rich or flaming coals, the ash and water contents of which are preferably limited to 10%. Said impact crusher comprises, in line along a vertical axis, an upper enclosure 1 provided with a duct 2 for supplying moist solid fuel, to which is associated a feed regulator 3 with an endless screw, and a duct 4 for feeding primary combustive gas, to which is associated a flow regulator 12 so arranged as to have said flow be large enough to retain in turbulent suspension the pulverized fuel, and not large enough to cause igniting thereof, two intermediate crushing enclosures 5 which each comprise a funnel 6 of truncated cone shape the axis of which lies on said vertical axis and the large base 7 of which is connected to said upper enclosure 1. The small base 8 of the funnel is located facing a movable crushing disk 9 which is fastened to the shaft 10 of a motor 11 supported inside the crushing enclosure 5, the motor 11 and disk 9 for each crushing enclosure being co-axial with the corresponding funnel 6, the fuel as crushed by each crushing disk 9, being projected onto the inner walls of a casing 13 provided by each crushing enclosure 5, surrounding the funnel, the inner walls thereof each being provided with a sheeting 23 made from a material having a high wear resistance. The impact crusher according to the invention further comprises a lower enclosure 14 connected to the casing 13 of the lower crushing enclosure 5, provided with a duct 15 for discharging crushed fuel and primary combustive medium to the combustion chamber. The drive motor 11 for each crushing disk 9 is secured through a plate 24 inside a tight box 16, co-axial with the funnel 6, supported inside the crushing casing 13 by tube-like arms 17 the one at least of which is hollow to allow powering the motor, a seal packing 18 being provided on box 16 in the location for the passage of shaft 10 the crushing disk 9 is fast on.

The crushing disks 9 comprise according to the invention, on that side thereof facing the small base 8 of funnel 6, pins 19 the axes of which lie in parallel relationship with the disk axis.

Each crushing disk 9 cooperates with a corresponding ring 20 secured to the circumference of the small base 8 of funnel 6, in co-axial relationship with the crushing disk, that side of each fixed ring 20 facing the corresponding crushing disk 9 being provided with pins 21 the axes of which lie in parallel relationship with pins 19 of crushing disk 9. The lengths of pins 19 are equal, as are the lengths of pins 21, the spacing between the sides facing one another of disk 9 and corresponding ring 20 being wider than the length of the longest pins, said latter pins may be comprised either of pins 19 or pins 21, and narrower than the sum of the length of pins 19 and the length of pins 21, the pins 19 and 21 being regularly distributed along circles the centers of which lie on that axis common to disk 9 and corresponding ring 20, in such a way that the pins 21 of each ring 20, distributed over a circle, always lie between the movable pins 19 from each corresponding crushing disk 9, distributed along two circles. Said pins 19 and 21 may be comprised of reinforced resilient pins from very hard spring steel, which are secured in holes 22 which are reamed or simply bored or drilled in the disk or ring, without reboring or other finishing operation. When being set in position, the resilient pins are compressed and push strongly due to the resilient force thereof, against the hole walls. There results therefrom a high permanent resistance of the assembly, even under varying impact loads. Moreover, said resilient pins are very inexpensive and easy to replace. The crushing pins 19 and 21 may also be drilled with holes having the same diameter as holes 22, the pins being secured in such a case on the disk or ring with resilient keys. The pins 19 and 21 may also be secured in the reamed holes 22 by mechanical or hydraulic expansion, or under the action of exploding a small inner charge, or else by brazing or welding. It will further be noted that pin crushing disks and pin rings may be made as a single part, for example by casting, forging, sintering, machining or any other suitable method. It is also possible according to the invention, to dispense with the fixed pins 21 on said rings 20, the movable pins 19 then being regularly distributed over the disk along radiuses thereof and with a narrow mutual spacing, to form close impact surfaces.

Inside each said crushing enclosures 5, the moist solid fuel in turbulent suspension in the primary gas combustive medium, enters through the truncated cone-shaped funnel 6 and passes through the opening provided in the small base 8 thereof into the volume defined between the fixed ring 20 and movable disk 19, where said fuel is projected by centrifugal force. The pulverizing of the fuel grains is insured by impacting and swirling between on the one hand the rotating pins 19 and fixed pins 21, and on the other hand between the outer row of rotating pins 19 and the inner lining 23 of casing 13. The driving by the combustive medium, the lack of fixed selectors such as grates or sluice-valves, the lack of movable selectors such as revolving arms or paddle-wheels, avoid any increase in the local concentration in solids and consequently avoid the clogging by agglomerating or sticking of moist particles. On the other hand, all the other conditions remaining the same, the lowering of the mean diameter of the fuel grains increases with the number of succeeding crushing enclosures 5 and with the revolution speed of the crushing disks 9. The mixture of finely pulverized moist fuel and primary combustive medium, after passing from the first crushing enclosure to the second crushing enclosure along the path of arrows 25, is carried along into the truncated cone-shaped funnel 26 of the lower enclosure 14, and it is discharged through duct 15 fastened thereto, to the burner.

FIGS. 2 and 3 show another embodiment of crushing apparatus according to the invention, which may be used instead of the impact crusher in the direct firing equipment of the invention, namely a ball crusher or mill for solid fuels the water content of which lies in the range from 4 to 50% from the mixture. The ball crusher comprises a cylinder-shaped drum 30 the length of which is substantially longer than the diameter thereof, as well as a supporting box 31 for the drum which is so arranged as to have the drum axis lie horizontally, said box 31 forming a cylinder-shaped cradle 32 which surrounds the side wall 33 of said drum over substantially half the circumference thereof, circle-shaped cheeks 34, 34a being provided on the drum bases 35, 35a, and the radius thereof being longer than the radius of said cradle 32, those box sides facing the drum side wall 33 and the circle-shaped cheeks 34, 34a, being provided with holes 36 forming nozzles, to let through pressurized air forming a cushion 37, which air cushion 37 serves on the one hand to support the drum 30, and on the other hand to retain same between the box 31 and the circle-shaped cheeks 34, 34a, along a direction in parallel relationship with the axis thereof, means (not shown) being provided to bring and retain the box 31 under pressure. The air, for example clean air under a pressure about 1000 mm water, is fed into box 31 through pipe 51 and escape through the many holes 36 with high head losses. Box 31 supports and guides the cylinder-shaped drum 30 and the circle-like cheeks 34, 34a, with the same pressure in every point. Such a feature of the invention enables the walls of cylinder-shaped drum 30 and possibly each one of the bases 35, 35a thereof to be made from a material having a low friction factor in dry condition and moist condition, as well as a high resistance to wear by abrading and friction, which material may for example be comprised of a high molecular weight polyolefine, preferably polyethylene or polybutylene, of polyurethane, of steel or cast iron, which are cast by centrifuging and hardened, of porcelain, of molten silica, of glass or any other material fulfilling the above features. The cylinder-shaped drum 30 is rotated about the axis thereof by a drive motor 38 with an axis in parallel relationship with the drum axis, by a gear wheel 39 keyed to motor shaft 40 and by a chain 41 meshing with a gearing 41 provided on the circumference of that cheek 34 associated with the drum base. The crusher balls 43 lying inside the drum 30, have a substantially sphere-like shape with a small diameter, in the range from 5 to 10 mm, and said balls are made from a material having a high specific weight and a high resistance to wear by abrading and sliding. These are for example balls from steel or chromium, cast iron, nickel-chromium, ceramic material or any other material fulfilling the above conditions. A duct 42 for supplying moist solid fuel, fixed relative to the drum and co-axial therewith, opens up inside the drum through an opening 44 provided in the base 35 thereof, the fuel supply being performed by means of a flow regulator 45 such as an endless screw regulator, which is arranged inside the supply duct 42, discharging of the pulverized fuel occuring by means of a duct 46 fixed relative to drum 30 and co-axial therewith, which opens up inside drum 30 through an opening 47 provided in the base 35a thereof. That opening 44 through which said fuel-supply duct 42 opens up in the drum, is so designed that there remains between the opening edges and the outer duct surface, a spacing 48 which is large enough for the passage of a primary combustive gas medium. The pulverized fuel and the primary combustive medium from cylinder-shaped drum 30, are conveyed to the combustion chamber by a fan 49 associated to the discharge duct 46, said fan 49 allowing to suck the primary combustive gas medium through the ring-like spacing 48 provided at the inlet, and through the ring-like spacing 50 provided at the outlet. The ball crusher might also be fed with solid fuel having a high water content, for example 30 to 50% of the mixture, so as to form a fluid paste which may be pumped. In such a case, the flow of the pulverized fuel from drum 30 to the combustion chamber would occur with a pump associated to the discharge duct 46. The continuous water phase would then replace the primary combustive gas medium during the crushing operation.

According to the invention, the drive motor 38 and the gears 39, 41 are designed for drum 30 to operate at a super-critical speed, that is higher than that limit speed for which the centrifugal force exerted on a crushing body, such as a ball or small ball, in the highest position thereof, is equal to and opposite to the force of gravity, in such a way that instead of falling back, the body will follow a centrifuging circle-like trajectory. In every conventional ball crusher or mill provided with serrated or corrugated inner linings, the friction factor between the lining and the charge is equal to 1, and crushing is possible but with under-critical speeds, where the balls fall back cascading upon one another with impact actions. To the contrary, in the ball crusher according to the invention, the inner surface of the cylinder-like drum 30 is absolutely smooth. The coefficient of friction between the drum and the charge or load is substantially lower than 1, the charge proper being reasonable. Crushing then becomes possible at super-critical speeds where the small balls strongly roll upon one another with attrition and compression actions. There results therefrom a much more intensive crushing action and a markedly higher specific production than with the conventional systems.

Another advantage of the ball crusher according to the invention lies in allowing to make a crusher or mill having a length-diameter ratio which is much higher than in the conventional systems, with a larger ratio for the reducing of the mean grain size. The ball crusher according to the invention thus allows to obtain a fine or ultra-fine crushing in a single pass, without any screen nor outside selector nor cycling-back of too large a product, and with a miminized power consumption. All the other conditions being equal, tests made with the ball crusher according to the invention have shown that the production of pulverized material was defined by the following relation:

$$P = K \times D^2 \times L \times N^{1.4}$$

with p=pulverized coal production in kg/h,
K=constant, depending on the materials being present,
D=inner diameter of the smooth drum, in m,
L=inner length of the smooth drum, in m,
N=revolution speed of the smooth drum, in rpm.

Figure 4:
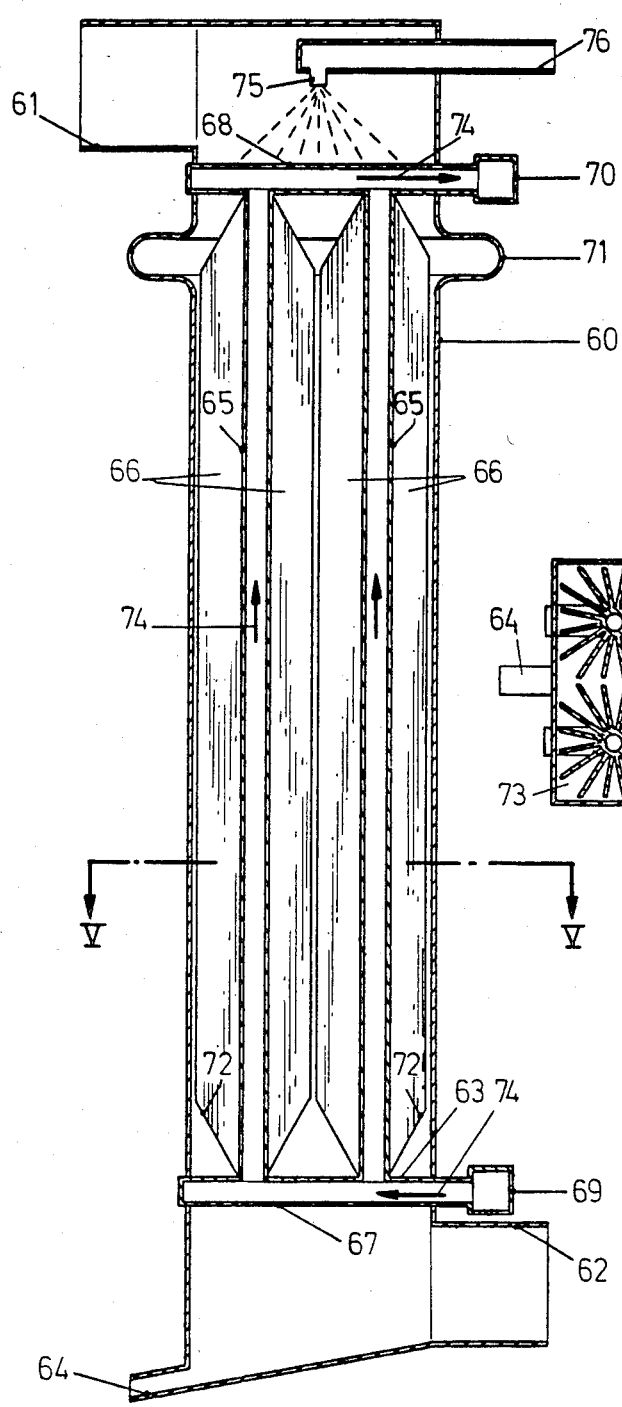
FIG. 4 is a diagrammatic elevation and section view showing a condensing heat extractor embodiment for the direct firing equipment according to the invention.
Figure 5:
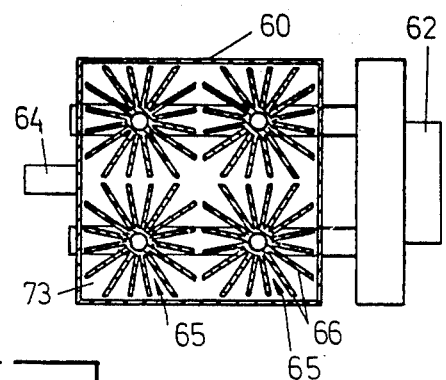
FIG. 5 is a section view along line V—V in FIG. 4.

FIGS. 4 and 5 are diagrammatic figures showing an embodiment of another part of the direct firing equipment according to the invention, that is a condensing heat extractor. The condensing heat extractor is designed to make it easier to separate the fly ashes and noxious materials, and is arranged upstream of the high-temperature exchanger in the plant. The combustion products or vapours, and a recovery fluid such as water, flow in counter-current along a direction which is vertical or at an angle relative to the vertical. The condensing heat extractor appears particularly advantageous with the independent, alternating or simultaneous use of gas, liquid and solid fuels. When the recovery fluid temperature is lower than the dew point of the combustion products or vapours, part of the water contained therein may be condensed. The extractor as shown in FIGS. 4 and 5 comprises an enclosure 60 with a vertical axis, or possibly an axis at an angle to the vertical, an inlet duct 61 for the hot combustion products arranged at the top of enclosure 60, an outlet duct 62 for the cooled combustion products arranged adjacent the lower enclosure base 63, an outlet duct 64 for condensed water arranged at the lower base 63 at a level lower than outlet duct 62, and tubes 65 with fins 66 lying inside the enclosure in parallel relationship with the axis thereof, between the inlet duct 61 and outlet duct 62 for the combustion products, inside which the recovered fluid flows. As it may seen in FIG. 5 of the accompanying drawings, said fins 66 are arranged radially and lengthwise relative to the axis of said tubes 65, four of which have been shown, the tube number is of course not limitative, said fins 66 may be smooth, corrugated, perforated or castellated. The fin tubes 65 preferably lie in rows, the tubes in each row being connected at the bottom to corresponding manifolds 67, and connected at the top to corresponding manifolds 68. Said manifolds 67 are connected to a main cold fluid manifold 69, and the manifolds 68 are connected to a main hot fluid manifold 70. An expansion joint 71 is provided in enclosure 60, to allow differential expanding between said enclosure and tubes 65 secured to manifolds 67 and 68.

Moreover, to make securing the tubes 65 to manifolds 67 and 68 easier, for example by welding, the fins 66 are cut off at both ends of each tube along planes 72 at right angle or at a slanting angle to the tube axis, or else along a truncated cone 72 the axis of which coincides with the tube axis. The number, the arrangement and the cross-section of fin tubes 65 are so selected as to leave between the fins 66, channels the width of which is substantially constant, about one cm, and to avoid free spaces where the combustion products might flow without any cooling. According to the invention, the cross-sections between fins 66 are in the shape of triangles 73, the height of which is preferably about one cm.

The combustion products or vapours flow outside the tubes 65 in descending stream, vertical or at an angle depending on the arrangement of enclosure 60, the condensed water and ashes being separated from one another due to speed reduction and gravity, are thus conveyed downwards. The recovery fluid flows inside said tubes 65 in ascending stream, vertical or at an angle depending on the arrangement of the enclosure, along the direction of arrows 74. The flow of both fluids at high speed and with a strong turbulence, in a straight line, inside moderately-sized channels, provides high total heat-conveying factors with moderate head losses. Inside the inlet duct 61 for the hot combustion products, jets 75 are arranged, but one of which is shown in FIG. 4, said jets being fed by duct 76 with water or solution, so as to allow periodically washing the outer tube surface, limiting the deposit of ashes or dusts over the heating surfaces, and insuring the retaining of good heat-conveying factors. The washing water is discharged through outlet duct 64.

As already stated hereinabove, the firing equipment according to the invention also allows scrubbing the combustion products or vapours discharged to the atmosphere. Such object is obtained simply by adding to the solid fuels, at the inlet to the crusher, or to combustion products from solid, liquid or gas fuels, or else vapours at the inlet to the condensing heat extractor, substances which can fix the noxious materials, such as sulphur and fly ashes, for example neutralizing products, such as calcium carbonate, potassium carbonate, sodium carbonate or quicklime. More than 90% of the sulfites and sulfates being formed by the reaction will thus go into solution or suspension in the condensed water and will be discharged to the sewer.

It must be understood that the invention is in no way limited to the above embodiments and that many changes may be brought thereto without departing from the scope of the invention as defined by the appended claims.

I claim:

1. Direct firing equipment comprising a burner, a combustion chamber, and a high temperature heat exchanger, a means for delivering moist solid fuel, means associated with said delivery means and downstream from a source of said fuel and upstream from the combustion chamber for crushing the moist solid fuel in the presence of a primary combustive fluid, and means for injecting the crushed moist solid fuel and primary combustion fluid directly into said combustion chamber, said crushed fuel retaining its moisture at the time when it and said primary combustion fluid is injected into said combustion chamber.

2. The equipment as defined in claim 1, in which said means for crushing the fuel are located along a vertical axis and comprise a crushing disk, a feed regulator, an upper enclosure having a fuel-supply duct associated with said feed regulator, a primary combustive gas medium feed duct associated with said flow regulator, said flow regulator maintaining a flow rate which is large enough to retain said crushed fuel in turbulent suspension and small enough to preclude an igniting thereof, at least one crushing enclosure having a drive motor therein and comprising a truncated cone-shaped funnel the axis of which lies on said vertical axis, a large base end of said truncated funnel being connected to said upper enclosure while a small base thereof lies facing said crushing disk, said crushing disk being fastened to a shaft of said drive motor inside said crushing enclosure with said motor and said disk being co-axial with the funnel and being oriented to project the fuel being crushed by the disk against inner walls of the crushing enclosure and funnel, a lower enclosure connected to the crushing enclosure, and a duct associated with said lower enclosure for discharging crushed fuel and said primary combustion fluid to the combustion chamber.

3. The equipment as defined in claim 2, and a tight box which is inside the crushing enclosure and which is co-axial with the truncated funnel, means for supporting the drive motor for the crushing disk inside said tight box said drive motor being supported by arms at least one of which is hollow to allow passage of conductors for powering the motor, a seal packing means on said box, said seal packing means surrounding said shaft, the crushing disk being fastened onto said shaft.

4. The equipment as defined in claim 2, in which inner walls of said crushing enclosure have a lining made of a material which has a high resistance to wear.

5. The equipment as defined in claim 2, in which the crushing disk has a side facing the small funnel base, pins mounted on said side, the pins having axes which lie in a parallel relationship with respect to the disk axis.

6. The equipment as defined in claim 5, in which said pins are regularly distributed over the disk along radiuses thereof, said pins being separated from one another by relatively narrow spacings.

7. The equipment as defined in claim 5, and a ring fastened to a periphery of the small funnel base, said crushing disk cooperating with said ring in a co-axial relationship with said crushing disk, a side of said ring facing the crushing disk and having pins the axes of which lie in a parallel relationship with respect to the crushing disk pins, the spacing between the sides of said disk and ring which face each other being wider than the longest length of the pins, and narrower than the sum of the length of the disk pins and the length of the ring pins, the pins of said disk being regularly distributed in at least two concentric circles and the pins on the ring being regularly distributed along at least a circle, said circles having centers which lie on an axis which is common to the disk and the ring, the pins fixed on the ring being distributed along a circle radially located between the concentric circles on the crushing disk.

8. The equipment as defined in claim 7, in which both the pin crushing disk and the pin ring are a single part.

9. The equipment as defined in claim 5, in which said pins are resilient reinforced spring pins with a very high degree of hardness.

10. The equipment as defined in claim 5, in which said pins are fastened inside reamed holes.

11. The equipment as defined in claim 1, in which said means for crushing the fuel comprises a ball mill having a cylindrical-shaped drum with a length which is longer than a diameter thereof, means for supporting the drum with its axis substantially horizontal, driving means for rotating the drum about the axis thereof, a fuel-supply duct fixed relative to and co-axial with the drum, said fuel-supply duct opening inside said drum via an opening in a first base end thereof, a feed regulator arranged inside said supply duct, a pulverized fuel-discharge duct fixed relative to and co-axial with said drum, said discharge duct opening inside said drum in a second base end thereof, and means for circulating the pulverized fuel and primary combustive medium from the drum to the combustion chamber.

12. The equipment as defined in claim 11, in which at least said opening through which the fuel-supply duct opens into the drum is between the edges of the opening and an outer surface of the duct, said opening providing enough space for the passage of said primary combustive fluid, said means for circulating the pulverized fuel and primary combustive medium from the drum to the combustion chamber including a fan associated with said discharge duct, said fan sucking the primary combustive fluid through said space around the fuel-supply duct.

13. The equipment as defined in claim 11, in which said means for circulating the pulverized fuel comprises a pump associated with said discharge duct for pumping fuel from said drum to the combustion chamber, the moist fuel having a water content of which lies in the range from 30 to 50%.

14. The equipment as defined in claim 11, in which the cylindrical-shaped drum is supported by means comprising a box forming a cradle which surrounds part of the circumference of the side surface of said drum, circular-shaped cheeks provided on opposite ends of said drum, the radius of said cheeks being longer than the cradle radius, those box sides facing the drum side surface and facing the cheeks being perforated to enable pressurized air to form an air cushion on the one hand to support the drum, and on the other hand to retain said drum between the box and cheeks in response to the air cushion, fixed along a direction in a parallel relationship with the axis thereof, and means to bring and retain said box under pressure.

15. The equipment as defined in claim 14, in which said driving means for rotating the drum about the axis thereof comprises a drive motor having an axis which is in a parallel relationship with an axis of the drum, a gear keyed on the motor shaft, and of a chain meshing with the gear and provided on the circumference of the one cheek associated with the drum base.

16. The equipment as defined in claim 15, in which said motor and gears impart a super-critical speed to the drum.

17. The equipment as defined in claim 11, in which the drum walls are made from a material having a low friction factor in both a dry condition and a moist condition, said material having a high resistance to wear caused by abrading and sliding, said ball mill having crusher balls with a substantially sphere-like shape and with a small diameter in the range from 5 to 10 mm, said balls being made from a material with a high specific weight and a high resistance to wear by abrading and sliding.

* * * * *